United States Patent [19]
Weimer et al.

[11] Patent Number: 5,194,234
[45] Date of Patent: Mar. 16, 1993

[54] METHOD FOR PRODUCING UNIFORM, FINE BORON-CONTAINING CERAMIC POWDERS

[75] Inventors: Alan W. Weimer; William G. Moore; Raymond P. Roach, all of Midland, Mich.

[73] Assignee: The Dow Chemical Company, Midland, Mich.

[21] Appl. No.: 758,029

[22] Filed: Sep. 12, 1991

Related U.S. Application Data

[62] Division of Ser. No. 152,613, Feb. 5, 1988, Pat. No. 5,110,565.

[51] Int. Cl.$^5$ .............................. C01B 35/00
[52] U.S. Cl. ................................ 423/297; 501/92; 501/96; 423/291
[58] Field of Search ............... 501/92, 96; 423/291, 423/297

[56] References Cited

U.S. PATENT DOCUMENTS

| | | | |
|---|---|---|---|
| 4,017,587 | 4/1977 | Ditter et al. | 423/291 |
| 4,282,195 | 8/1981 | Hoekje | 423/289 |
| 4,597,948 | 7/1986 | Sanjurjo | 422/199 |
| 4,643,890 | 2/1987 | Schramm | 423/659 |
| 4,818,511 | 4/1989 | Nishi et al. | 423/344 |
| 5,032,242 | 7/1991 | Knudsen et al. | 204/157.41 |

FOREIGN PATENT DOCUMENTS 665291 6/1963 Canada .......................... 23/204

Primary Examiner—Karl Group
Assistant Examiner—Chris Gallo
Attorney, Agent, or Firm—B. J. Tribble; D. R. Howard

[57] ABSTRACT

Uniform, fine ceramic powder is prepared using an apparatus comprising (a) a cooled reactant transport member; (b) a reactor chamber; (c) a heating means; and (d) a cooling chamber. The reactant transport member comprises a wall defining a conduit that communicates with the reactor chamber, with a gas-flow space being defined along the perimeter of the transport member and in communication with the reactor chamber. The reactor chamber comprises a wall defining a reaction zone, and the heating means is associated with the reaction zone, and adapted for heating reactants in the reaction zone. The cooling chamber comprises a wall defining a cooling zone that communicates with the reactor chamber. In one embodiment the communication is by means of a cooling inlet, the diameter of the cooling zone being larger than the diameter of the cooling inlet. The temperatures of the reactant transport member, the reactor chamber, and the cooling chamber are independently controllable. Reactants can be fed through the reactant transport member into the reaction zone and reacted to form products, and the products then fed into the cooling zone to produce uniform, fine ceramic powders.

20 Claims, 3 Drawing Sheets 0.25 MICRONS
20 MICRONS
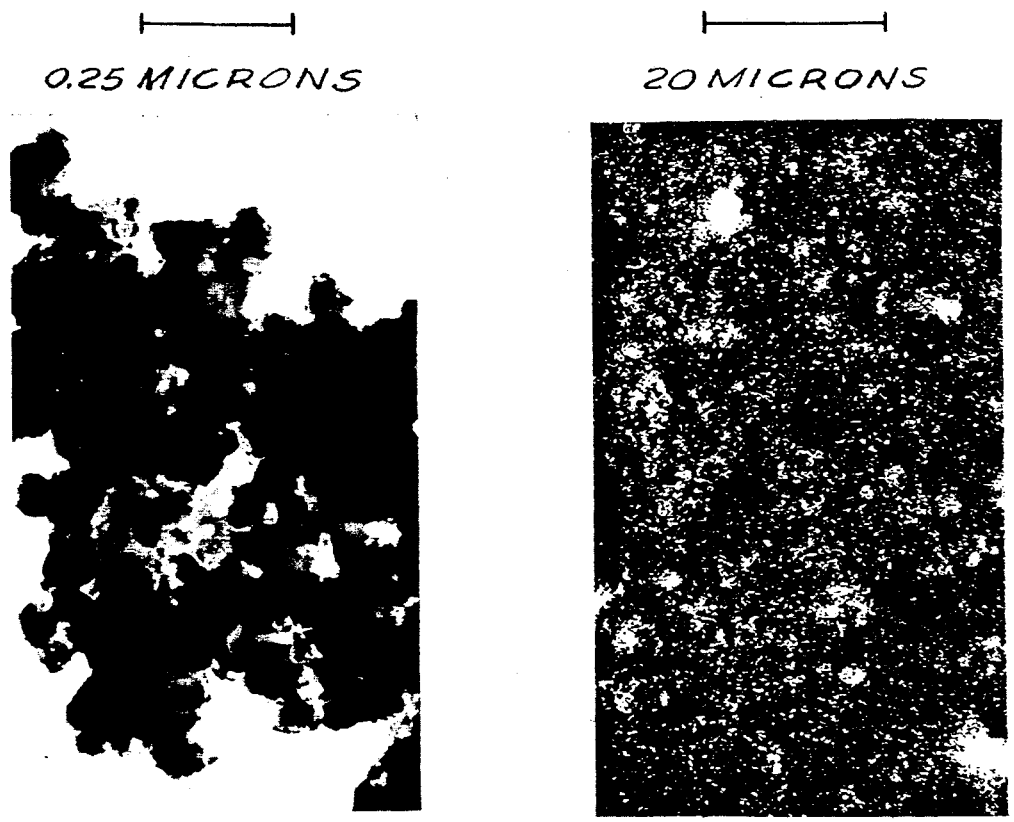
Fig. 3
Fig. 4
20 MICRONS
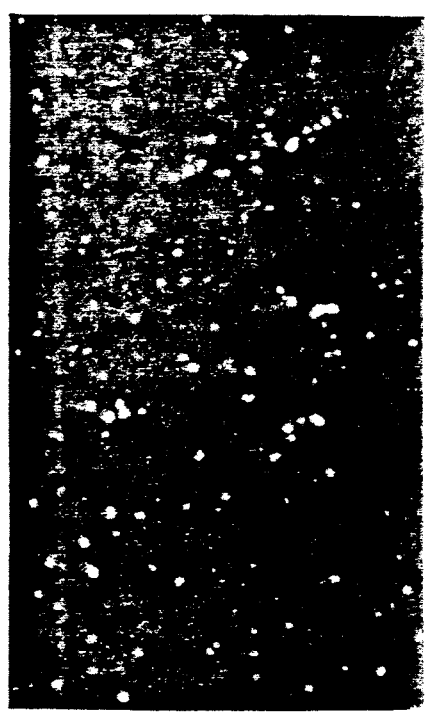
Fig. 5

METHOD FOR PRODUCING UNIFORM, FINE BORON-CONTAINING CERAMIC POWDERS

CROSS-REFERENCE TO RELATED APPLICATIONS

This is a division of application Ser. No. 07/152,613 filed Feb. 5, 1988 now U.S. Pat. No. 5,110,565.

FIELD OF THE INVENTION

The present invention relates to the field of ceramic powders. More particularly, it relates to an apparatus and method for producing ceramic powders.

BACKGROUND OF THE INVENTION

In recent years ceramic materials have found a wide variety of applications in many industries. Extensive efforts have been directed toward the development and manufacture of ceramic parts that exhibit the desirable physical properties of the constituent materials, e.g., hardness, maintenance of structural integrity at high temperatures, and chemical inertness. Efforts have also been directed toward the elimination of defects which often result in failure of ceramic parts. These potential failures represent a significant impediment to the increased use of ceramic materials in certain applications, and can often be attributed to small cracks or voids resulting from incomplete packing of the precursor powders. One solution to this problem s the manufacture of fine, monodispersed powders which can be packed tightly, thereby reducing the void spaces between particles. It has been suggested, by E. A. Barringer and H. K. Bowen in "Formation, Packing and Sintering of Monodispersed TiO$_2$ Powders," *J. Amer. Ceram. Soc.* 65, C-199 (1982), that an 'ideal' ceramic powder for producing a high quality part would be of high purity and contain particles which are monodispersed, spherical, nonagglomerated and of a particle size ranging from about 0.1 to about 1.0 micron in diameter.

Using fine ceramic powders in engineered ceramic parts offers a number of advantages. For example, as a ceramic powder is densified, adjacent particles generally fuse into grains. In general, the grain size is governed by the crystallite size within the particles from which the part is prepared, that is to say, the grain size is generally larger than the size of the crystallites from which a part is fabricated. Thus, the densification of fine particles composed of fine crystallites presents the opportunity to produce fine-grained bodies. An additional advantage in the use of ceramic powders with a fine uniform crystallite size is that the temperatures required to densify the powders are often reduced. On an industrial scale, this can result in a considerable savings in energy.

The relationship between grain size and physical integrity has also been investigated. For example, A. D. Osipov et al. researched this relationship for boron carbide bodies in "Effect of Porosity and Grain Size on the Mechanical Properties of Hot-Pressed Boron Carbide," *Sov. Powder Metall. Met. Ceram.* (Engl. Transl.) 21(1), 55-8 (1982). The authors found that parts exhibiting a finer grain size were significantly stronger than parts consisting of coarse grains. Thus, boron-based systems can clearly profit from control of grain size.

In view of these findings considerable research has been devoted to developing methods and means of producing uniform, fine-sized ceramic powders. Commercial production of ceramic powders has typically been achieved batchwise, through attrition milling, acid leaching, and size classification of ceramic powders. These powders have generally been synthesized via reactions employing slow, non-uniform heating over extended time periods. For example, commercial production of boron carbide is most commonly carried out by the reduction of boric oxide with carbon in a batch electric arc furnace, as described by A. Lipp in "Boron Carbide: Production, Properties, Application," *Technische Rundschau*, No. 14, 28, 33 (1965) and 7 (1966). Reaction and cooldown take place over an extended period of time, on the order of days, because of the slow rate of heat conduction which controls the process. The non-uniform process conditions result in non-uniform chemical compositions and crystal sizes within the product. The sintered mass of product which results from this process requires physical size reduction in order to achieve a particle size fine enough for densification. Because of the extreme hardness of boron carbide, this size reduction step is extraordinarily difficult and expensive and results in contamination of the product with impurities picked up during milling. Acid leaching of metal impurities is necessary and further complicates the process.

Because of the problems encountered due to the slow, non-uniform heating and subsequent processing complications, researchers have sought methods of producing suitable powders directly, such that size reduction and other additional steps can be avoided. One effective method involves the direct synthesis of powders from laser-heated gases. For example, R. A. Marra and J. S. Haggerty, in their article, "Synthesis and Characteristics of Ceramic Powders Made from Laser-Heated Gases," *Sci. Proc.* 3, 31 (1982), describe the preparation of silicon, silicon carbide and silicon nitride powder by driving exothermic reactions involving SiH$_4$. The result is equiaxed, monodispersed powders with particle sizes in the range of 0.01-0.1 micron. Marra and Haggerty further state that this laser-heated process can be used to produce both oxide and nonoxide ceramics such as TiB$_2$, AlN, B$_4$C, and so forth.

Powders have also been synthesized from radio frequency plasma-heated gases. See, e.g., Steiger U.S. Pat. No. 4,266,977. That patent describes a gas phase pyrolysis process for manufacturing submicron sized, carbon-containing titanium diboride powders whereby titanium halide and gaseous boron source (e.g., boron trichloride) reactants are mixed with a hot stream of hydrogen produced by heating hydrogen in a plasma heater.

In another gas phase type synthesis process, Latham, Jr., in U.S. Pat. No. 3,346,338 discloses the continuous production of finely divided silicon or titanium carbide by passing a vapor of each reactant into one end of a furnace reaction zone and then recovering from the other end of the reaction zone a finely-divided carbide product.

In general, the laser- or plasma-heating of reactant gases is characterized by almost instantaneous heating rates of reactants, short reaction times (fractions of a second) with minimal exposure to high temperature, and almost instantaneous product cooling rates. The net result of the nearly instantaneous and uniform heating rates is submicron, uniformly sized ceramic particles. However, while gas phase synthesized powders possess many of the desirable qualities, they are relatively expensive to produce because of the inherently slow generation rate and high cost of equipment and gaseous raw material (e.g., boron trichloride) which they require. Thus, the gas phase routes, while academically intriguing, may not be practical for commercial use.

Another method for directly manufacturing fine ceramic powders is via the reduction of a metal oxide with a metal, the so-called "thermite reaction." For example, U.S. Pat. No. 2,834,651 discloses a batch method of producing boron carbide of fine particle size by heating a mixture of boric oxide, carbon, and magnesium. Typically, reactants are intimately mixed, loaded into a container, and the reaction initiated either by heating the entire reaction mixture to a sufficiently high temperature or through the use of fuses and the like. The thermite reaction is highly exothermic and self-propagating. Although typically fine in size, particles produced by the thermite process are of a fairly wide distribution (0.2 to 10 microns) due to non-uniform heating rates, temperatures, and reaction times at temperature. Since excess metal typically is used in these reactions, a post-treatment acid leach/wash step to solubilize and wash out residual metals is required. The ceramic powders produced by the thermite reaction are unsatisfactory for high purity applications because the powders are contaminated with residual metals. Even after repeated digestion with hot mineral acids, these are difficult to remove.

Efforts to directly produce uniform, fine powders by less expensive, more commercially practicable means have included various furnace modifications. In general these involve passing solid reactants through a heated, relatively restricted space, containing inert or reaction-compatible gases, at a variable rate according to the desired reaction and the necessity to avoid decomposition of the desired product. For example, in Serpek U.S. Pat. No. 1,212,119 discloses a vertical furnace in which a mixture of carbon and an aluminous material is heated, while either free-falling in a nitrogen atmosphere or being swept in a nitrogen stream, sufficiently to produce aluminum nitride. Another patent to Serpek, U.S. Pat. No. 1,217,842, discloses a furnace in which the gaseous current does not sweep through the reaction zone along the same path as the reactant material, but rather passes through porous walls into the reaction zone. This inhibits deposition of either reactant materials or product on the porous walls of the reactor.

Two types of vertical, "fluid wall," tubular reactors are described in a number of patents to Matovich (U.S. Pat. No(s). 3,933,434; 4,042,334; 4,044,117; 4,056,602: 4,057,396: 4,095,974: 4,199,545; and 4,234,543). These reactors have an inlet end, a reaction chamber, and an outlet end. The reaction chamber is defined as the interior of the envelope of inert fluid which protects the inside tube wall from reactants and products of reaction. The two types of reactor arise from the method in which the "fluid wall" annular envelope is generated. In one embodiment the reactor has a porous wall through which inert fluid flows radially inward of the inner surface of the reactor tube. In the other embodiment a laminar diffuser is located adjacent to the inlet end and causes a fluid directed under pressure to flow in substantially laminar fashion through the reaction chamber. This provides a protective blanket for the interior surface of the reactor tube. In general these reactors are described as being useful for a variety of chemical processes involving pyrolysis, thermolysis, dissociation, decomposition and combustion reactions of both organic and inorganic compounds.

Enomoto et al., in U.S. Pat. No. 4,292,276, discloses an apparatus for producing silicon carbide consisting mainly of beta-type crystals. It uses a vertical-type reaction vessel having an inlet for a starting material, a preheating zone, a cooling zone, and a closable outlet for a product in this order. The closable outlet allows extended reaction times, on the order of hours, for the gravity-fed briquettes, which are typically 3 to 18 mm in diameter. This design uses electrically indirect heating.

No special provisions are made with any of these reactor/furnace designs for the continuous entry of meltable solids into the reaction chamber, or for the continuous discharge of condensing fluids through the outlet end. A particular problem is encountered when using feedstocks comprising boric oxide, boric acid, or boric oxide with surface moisture, which behaves as boric acid, to produce boron-containing products Boric oxide is of particular commercial significance as a starting material for a number of these boron-containing ceramic compounds because of its relatively low cost and easy availability. The problem, however, is that boric oxide softens at about 325° C., melts at about 450° C., and volatilizes at above about 1400° C. Boric acid goes through a melt phase at about 150° C. to 175° C., forming the liquid meta borate BO·OH. When the furnace designs described above are used with boric oxide, the particles go through a heating cycle from below about 150° C. to above about 1400° C. as they enter the furnace reaction zone, and thus are inevitably in the liquid stage at a certain place near the inlet of the reaction zone. This means that liquid boric oxide will tend to deposit somewhere near the entrance to the furnace reaction zone, which often causes plugging problems.

Even when entrainment gas (inert or reaction-compatible gas) is used to entrain fine reactant powder containing boric oxide into the reactor's reaction zone, counter-flowing thermal eddy currents within the reactor inevitably force a substantial quantity of fine reactant powder against cooler inlet surfaces, resulting in plugging due to the formation of larger agglomerates containing boric oxide. These larger agglomerates may then fall or be swept through the reaction zone to yield product agglomerates having incompletely converted inner cores of reactant.

A problem encountered specifically with the use of a "fluid wall" reactor is that of limited residence time within the reaction zone. A significant quantity of fluid is necessary to generate the annular envelope of gas which protects the reactor wall. The residence time of reactant powder transported through the reactor is highly dependent on the flow rate of gas within the reactor tube. Hence, it is expected that in carrying out a reaction between solids (such as boric oxide and carbon to synthesize boron carbide and carbon monoxide) it will be necessary to minimize the flow of unnecessary inert fluids in order to maximize reactor capacity. This is especially true if the inert fluid is expensive, such as are argon or helium.

Another problem with using the known furnace configurations is that of preventing the condensation of excess vaporized reactant (e.g., boric oxide) along the inside walls of the cooling zone in those designs having such a specified area. Excess boric oxide is typically employed in the reactant mixture because any unreacted boric oxide is soluble in water and can usually be easily washed from the product powder. When the furnace designs described above are used with excess-boric oxide-containing feeds, the exiting product contains vaporized boric oxide which goes through a cooling cycle from above 1400° C. to below 325° C. as it passes within the cooling zone, and thus inevitably is in the liquid stage at a certain place near the inlet of the reactor cooling zone. This means that liquid boric oxide will tend to deposit and solidify within the inlet of the cooling zone, again often causing plugging problems and preventing continuous operation.

Some other problems encountered are related to the final product. First, it is extremely difficult to produce metastable products, such as the boron-rich boron carbides, with many of the known furnaces because the cooling, called "quenching," is not rapid enough to essentially stop the reaction at a metastable point. Finally, the known furnaces may not be capable of producing the desired uniformity and submicron size for optimal performance of a densified ceramic piece. Unlike the laser method, which offers extremely large, almost instantaneous and uniform temperature differentials, the known furnaces offer environments in which the temperature gradients are much more gradual and significantly less uniform, and thus there is opportunity for crystallite growth and therefore an increase in grain size in the densified piece.

Thus, it would be desirable to develop an apparatus and method of producing uniform, fine ceramic powders, of preferably submicron diameters and high purity. Such an apparatus and method should preferably be adaptable to the use of boric oxide as a feedstock and eliminate or reduce the problems of deposition on the furnace walls, at any point in the process, of either feedstocks or products. It should also preferably be adaptable to the production of metastable-form boron-containing ceramic powders and boron-containing composite ceramic powders.

SUMMARY OF THE INVENTION

The present invention provides an apparatus for producing uniform, fine ceramic powder comprising: (a) a cooled reactant transport member; (b) a reactor chamber: (c) a heating means; and (d) a cooling chamber: the reactant transport member comprising a wall defining a conduit that communicates with the reactor chamber, with a gas-flow space being defined along the perimeter of the transport member and in communication with the reactor chamber: the reactor chamber comprising a wall defining a reaction zone: the heating means being associated with the reaction zone, and adapted for heating reactants in the reaction zone: and the cooling chamber comprising a wall defining a cooling zone that communicates with the reactor chamber: the temperatures of the reactant transport member, the reactor chamber, and the cooling chamber being independently controllable: such that reactants can be fed through the reactant transport member into the reaction zone and reacted to form products, and the products then fed into the cooling zone to produce uniform, fine ceramic powders.

In one embodiment of the present invention the cooling chamber comprises a wall defining a cooling zone that communicates with the reactor chamber by means of a cooling inlet, wherein the diameter of the cooling zone is larger than the diameter of the cooling inlet.

The present invention also comprises a method of producing uniform, fine ceramic boron-containing powders by rapid carbothermal reduction using the apparatus of one embodiment of this invention. This method comprises (1) feeding boric oxide or a hydrate thereof and a carbon source as reactants through the cooled reactant transport member, this reactant transport member being maintained at a temperature below the melt temperature of the reactants: (2) reacting the reactants at a temperature above about 1400° C. in the reaction zone to form a uniform, fine boron-containing ceramic powder; and (3) cooling the ceramic powder product in the cooling zone. The method is adaptable to continuous operation and is suitable for use in producing boron-containing composite powders and boron-containing metastable-form powders.

Finally, the present invention also comprises the boron-containing product powders made by this method, and the densified parts made from these product powders.

BRIEF DESCRIPTION OF THE DRAWINGS

FIG. 3 is a transmission electron micrograph at a magnification of 144,000× of a $B_4C/2.2$ weight percent $TiB_2$ composite powder prepared at 1900° C. according to the method of one embodiment of the present invention.

FIG. 4 is an energy dispersive X-ray spectroscopy photomicrograph (Ti K-alpha X-ray map) at a magnification of 800× of a $B_4C/2.2$ weight percent $TiB_2$ composite powder prepared at 1900° C. according to the method of one embodiment of the present invention.

FIG. 5 is an optical photomicrograph at a magnification of 1000× of an etched, dense part fabricated from a $B_4C/TiB_2$ composite powder prepared at 1900° C. according to the method of one embodiment of the present invention.

DESCRIPTION OF THE PREFERRED EMBODIMENTS

The present invention provides an apparatus and method for manufacturing fine, uniformly sized boron-containing ceramic powders by rapid carbothermal reduction, the method approaching the uniformity and rapid process temperature differentials of the gas-phase laser and plasma heated processes, but at a substantially reduced cost. In one embodiment the present invention is an apparatus suitable for use in producing uniform, fine ceramic powders. The ceramic powders produced thereby preferably exhibit individual crystal diameters of less than about 1 micron, more preferably less than about 0.5 micron, while particles preferably range from submicron to about 20 microns. The apparatus is a reactor having essentially four main parts. These are: (1) the cooled reactant transport member; (2) the reaction chamber; (3) the heat source: and (4) the cooling chamber. The reactor apparatus will be described in greater detail with reference to the drawings.

The reactor apparatus of one embodiment of the present invention comprises a reactor in which starting reactants can be rapidly and uniformly heated to react them, and then the product rapidly cooled and continuously removed from the reactor. The rate of heating and cooling is sufficiently rapid and uniform to enable the production of fine powders consisting of uniform, submicron sized crystallites. Furthermore, the cooling is sufficiently rapid to enable the preparation of either stable products such as $B_4C$, or metastable products such as boron-rich boron carbides including $B_8C$, $B_{25}C$ and $B_{13}C_2$. The reactor's design enables the elimination or reduction of reactant plugging problems, particularly when boric oxide-based feedstocks are employed, and helps to eliminate product plugging problems as well.

Figure 1:
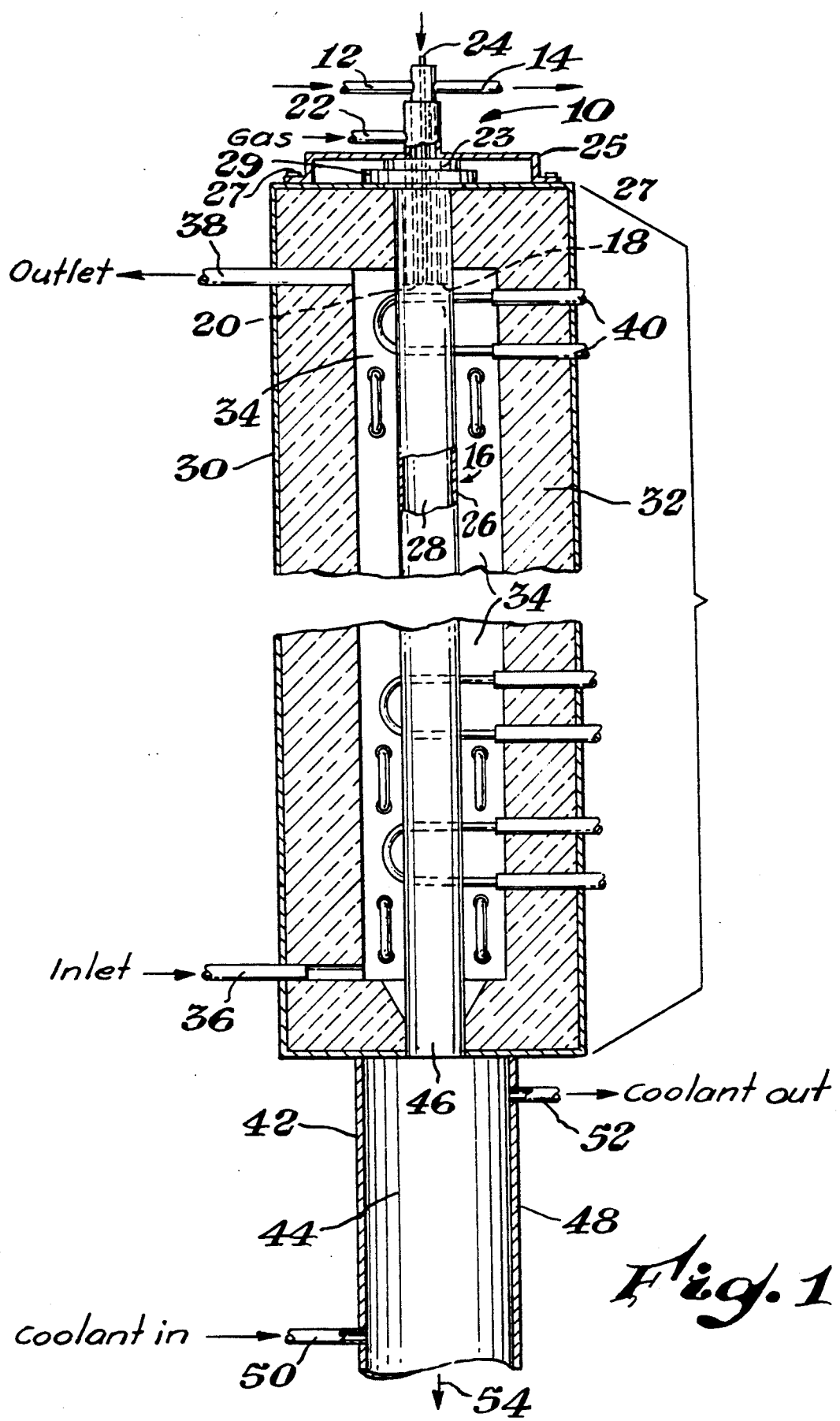
FIG. 1 is an elevational view, mostly in cross-section, of the reactor apparatus of one embodiment of the present invention illustrating with arrows the path of the reactants and product.
Figure 2:
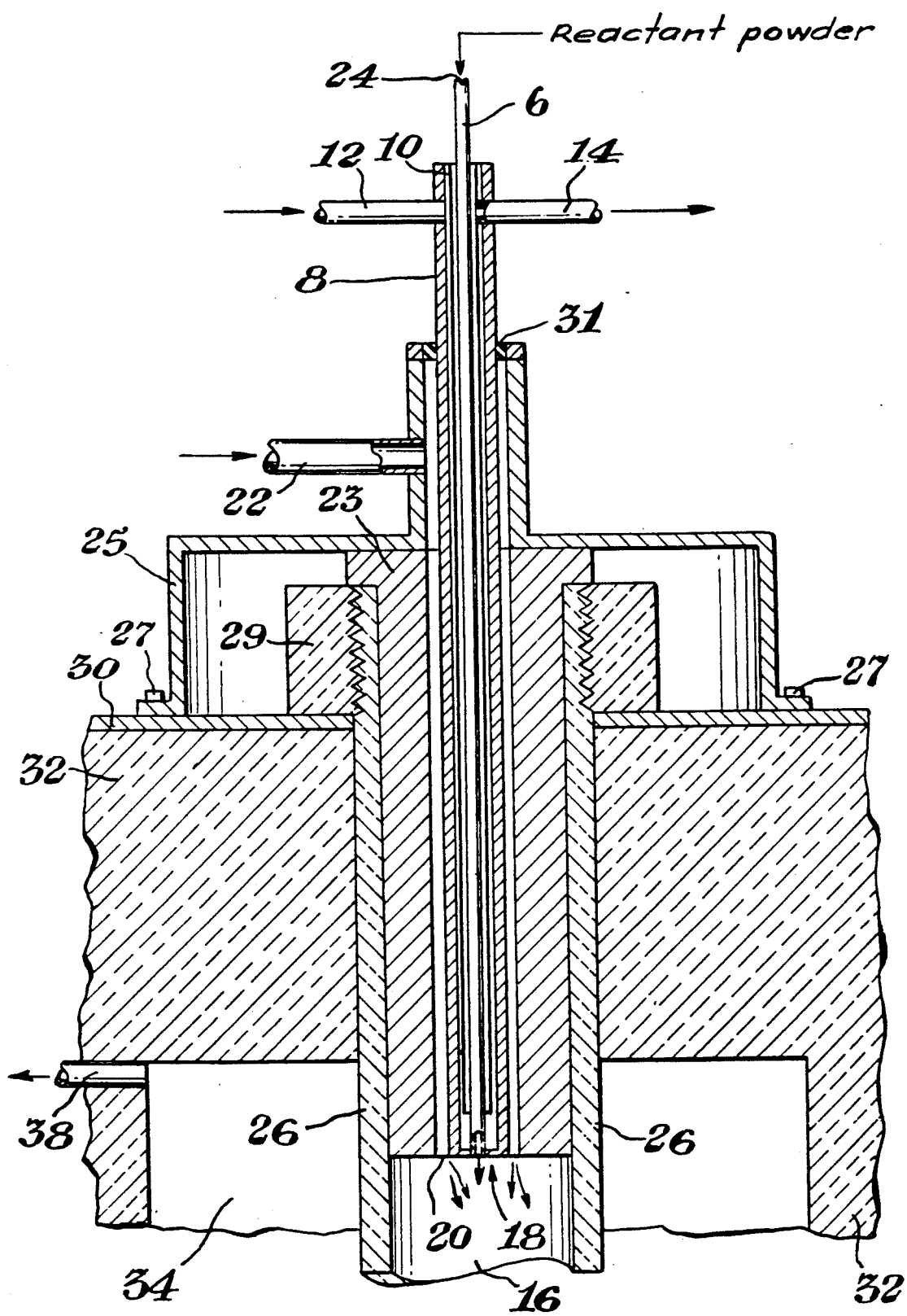
FIG. 2 is a detail elevational view, mostly in cross-section, of the upper section of the reactor apparatus shown in FIG. 1.

A design modification particularly directed to the reduction of reactant plugging problems involves the cooled reactant transport member. Referring to FIGS. 1 and 2, it is seen that the cooled reactant transport member 6 comprises a wall defining a conduit for injecting reactants. This reactant transport member can be cylindrical, rectangular, or of other effective configuration. The reactant transport member is preferably constructed of copper, which exhibits the desired thermal conductivity to allow placement of at least its tip directly within the radiating reactor chamber. Preferably a short length of it can be placed directly, within the radiating reactor chamber. Other conductive materials can also be used. The member is cooled, preferably with cold water flowing through a cooling jacket 8. The jacket is preferably baffled by baffle 10 with coolant flowing in through a coolant inlet 12 and out through a coolant outlet 14. Other suitable heat transfer systems can also be used.

This reactant transport member is arranged in fluid connection with the reactor chamber 16 such that at the transport member exit 18 there is a gas-flow space 20 defined along the perimeter of the cooled member, i.e., outside of the cooling jacket or other heat transfer system, and in communication with the reactor chamber 16. In one preferred embodiment of the present invention there is one cooled reactant transport member in communication with the reactor chamber 16. In another preferred embodiment there are a plurality of reactant transport members in communication with the reactor chamber 16, to enable separation of multiple reactants prior to introduction into the reaction chamber 16. The gas-flow space is at some point continuous with a sweep gas inlet 22, and is preferably open along its entire lower limit to allow sweep gas to exit into the reactor chamber. Thus, the space can preferably describe an annular region. The sweep gas inlet 22 can be constructed such that it is part of the metal support sleeve 25, which can be secured to outer shell 30 by bolts 27 at one edge and is preferably gasketed by gasket 31 at the opposite end to help to ensure a gas seal. Plug 23, preferably made of graphite, forms the substantial portion of the upper surface of the reactor chamber. The reactant transport member further comprises an inlet opening 24.

Reactor chamber 16 comprises a reactor wall 26 which is preferably constructed of graphite. Other refractory materials, such as other carbonaceous materials, can also be used. The reactor wall is preferably supported by being threaded into threaded bushing 29. This wall defines the reaction zone 28. Preferably concentric with this reactor wall 26 is an outer shell 30. The outer shell serves to shield the environment from the extremely high temperatures, generally above about 1400° C., which will be used in the reaction zone. The outer shell preferably encloses a layer of an insulating material 32, and is cooled using an appropriate system such as a water-cooling system. In one embodiment of the present invention there is also a gas purge region 34, which surrounds the reactor wall 26 and is located inside the outer shell 30. This gas purge region is also in fluid connection with purge gas inlet 36 and purge gas outlet 38.

Located proximate to the reactor chamber 16 and its enclosed reaction zone 28 is a heating means 40. In the embodiment of FIG. 1 the heating means is a group of heating elements or electrodes located outside of the reaction zone, which heat the reactor wall 26, which then radiates to heat the contents of the reaction zone 28. The electrodes are preferably graphite and can be disposed vertically or horizontally. They can be of any shape, including hairpin and linear rod configurations. Direct or inductive heating of the reactor wall 26 by electrical resistance using an appropriate source of electricity is also possible. It is preferred that the heating means be disposed such that, in particular, the area of the reaction zone directly proximate to the reactant transport member can be maintained at the desired reaction temperature. This helps to ensure very rapid heating of the reactants as they pass from the reactant transport member into the reaction zone.

At the opposite end of the apparatus from the reactant transport member 10 is the cooling chamber 42. This cooling chamber comprises a cooling zone 44 which communicates with the reaction zone 28 by means of a cooling inlet 46. The cooling chamber is preferably configured such that its diameter is larger than the diameter of the cooling inlet 46 disposed between the reaction zone 28 and the cooling zone 44. Diameter is defined to mean the greatest distance across the given cross-sectional area, and thus can refer to the greatest distance across a circular or elliptical cross-section, or the diagonal length of a rectangular cross-section. It is preferred that the cooling inlet is of approximately the same diameter as the reaction chamber; however, it is also possible for the cooling inlet to be constricted relative to the reaction chamber. Where there is no constriction, it is thus inherent that the cooling chamber preferably has a diameter that is larger than the diameter of the reactor chamber, and where there is a constriction the cooling chamber preferably has a diameter as defined that is larger when compared with the cooling inlet. Like the reactant transport member and the reactor chamber, the cooling chamber can be essentially cylindrical, elliptical, rectangular, or of other effective configuration. It comprises a cooling wall 48 which allows for maintenance of temperatures below about 350° C., preferably below 100° C. and most preferably below 50° C. in the cooling zone. Thus, the use of an appropriate water-cooling jacket or other system is effective and can be incorporated into the apparatus, or applied externally, as desired with coolant flowing through coolant inlet 50 and coolant outlet 52. It is also within the scope of the present invention to employ other cooling means, such as cool gas quenching systems, such as are known to those skilled in the art. The selected means thus is any means suitable to allow for very rapid cooling of the product powder as it exits from the reaction chamber.

Finally, the apparatus of the embodiment of FIG. 1 has an exit 54 at its opposite extreme from the reactant transport member. The exit can preferably be in fluid connection with a collection device (not shown), such as a cyclone or bag filter, in which the final product of the reaction can be collected for further processing as desired.

Operation

The method by which the apparatus of the present invention can be used, including but not limited to the apparatus described in the embodiment illustrated by FIG. 1 and FIG. 2, will be described in detail. For the sake of illustration only, the reactants described will be particles of boric oxide and carbon, in a carbothermal reduction process for producing boron carbide. However, numerous other reactants are also possible, depending on the final product desired. For example, reactants conducive to the production of other boron-containing compounds such as $TiB_2$, $BN$, $HfB_2$, $ZrB_2$, $WB$, $CrB$, $SiB_6$ and $Mo_2B$; composites thereof such as $B_4C/TiB_2$, $B_4C/AlN$, $B_4C/SiC$, $SiC/SiB_6$, or $SiC/AlN/BN$; and metastable compounds, including $B_{13}C_2$, $B_8C$, and $B_{25}C$, can also be employed. The boric oxide source can also be boric acid, which can be dehydrated to boric oxide. The dehydration can occur partially or possibly completely within the furnace, and can be effected by addition of excess carbon, which will react with the water of decomposition. The carbon source can be a carbon formed from the thermal decomposition of a hydrocarbon, or it can be selected from the group consisting of carbohydrates, such as sugars, starches and methyl cellulose; forms of carbon, such as carbon black and acetylene carbon black; other carbon-containing compounds, such as vinylidene chloride polymer; and mixtures thereof. It may be possible to thermally decompose a hydrocarbon to carbon within the furnace itself. Other reactants can also be employed within the scope of the present invention.

A feed is preferably first prepared. This feed can be prepared by physically blending the solid reactants or by drying a liquid solution containing reactants on the surface of a rotating drum or within a dryer. Milling or grinding of the feed particles may be necessary in order to achieve desired particle size. This can be done with jet mills, ball mills, attrition mills, hammer mills, or any other suitable device. It may also be desirable to directly spray dry a liquid solution, slurry or gel of the reactants in order to achieve the desired particle size. The spray dried solution can incorporate water or, in some cases, an appropriate organic material as a solvent, particularly where boric oxide is employed as a reactant. The feed particles should preferably have a diameter of less than about 150 microns, more preferably less than about 100 microns, and most preferably less than about 50 microns. This is because larger particles or aggregates will tend to fall through the reaction zone having only their surfaces reacted. Dispersers such as opposing jets, centrifugal fans and the like can be employed to break up any agglomerates present in the feed prior to its introduction into the reaction zone.

It is preferred that the feed be introduced using a feeder system that produces as uniform a flow of the feed as possible. Many known feeders, such as star valves, slow speed screw feeders, and the like, tend to feed "slugs" of feed material sporadically, with intermittent dwell times during which no feed is delivered. The high amount of feed delivered in the "slugs" can be sufficient to prevent complete reaction, showing perhaps an eight-fold increase over the average instantaneous feed rate. Thus, it is preferred to use a feeder system that gives more uniform instantaneous feed rates, such as a belt feeder, a modified screw feeder, or a vibratory feeder. In one embodiment of the present invention it is preferred to use a feeder system that is essentially a modified screw feeder. A pipe of some type, such as a ½ inch plastic pipe, is placed inside the helical screw, thereby decreasing its volumetric displacement per revolution by a factor of about three when the helical screw has a diameter of about 1 inch. The screw would then deliver the same amount of feed at about three times the speed, giving instantaneous rates that are much lower and also shorter dwell times.

The particles of the feed, preferably boric oxide and carbon, are entrained in a gas, which can be either an inert gas, such as argon or another noble gas, or a gas which is compatible with the desired reaction, i.e., either serves as a reactant or is the same as that produced as a reaction byproduct. For example, argon, helium, nitrogen and hydrogen can be used. Hydrogen may be particularly compatible since water in the feed will react with the carbon to produce carbon monoxide and hydrogen, and the same is true where boric acid is present in the feed. Nitrogen could be employed in cases where a nitrogen-containing compound is sought or acceptable, e.g., in the production of boron nitride. In the case of boric oxide and carbon, carbon monoxide can alternatively be employed, since in this case also carbon monoxide is produced as a reaction coproduct. The entrained particles are then introduced into the reactant transport member 6 via the inlet member 24. The gas serves as a carrier to move the particles through the apparatus. In a preferred embodiment the apparatus is positioned vertically, with the reactant transport member at the top and the cooling chamber at the bottom, and in this orientation gravity also assists in moving the particles. However, the apparatus can be used in alternative positions, e.g., horizontally, as long as there is sufficient entrainment gas velocity to ensure continuous movement of the particles through the reactor.

At the same time a sweep gas, which is again preferably either an inert gas or a reaction-compatible gas, is passed through gas-flow space 20, where it tends to inhibit contact of any entrained solid, liquid or vapor reactant particles from coming into contact with internal reactor surfaces, particularly the surface designated as plug 23 and in general around the juncture between the reactant transport member and the reaction zone, the area generally designated as 18. These reactor surfaces may be at an intermediate temperature between about 325° C. and 1400° C. Where boric oxide is used as a reactant it would be liquid in this temperature range and would tend to stick and plug at these sites. This results in the formation of large agglomerated particles which could pass through the reaction zone and, upon collection as product, contain incompletely converted inner cores of reactant.

The sweep gas continues out into the reaction zone 28, where it mixes with the entraining gas and reactant particles. Because of the action of the cooling apparatus or system, such as cooling jacket 8, the temperature in the reactant transport member is preferably less than about 350° C., more preferably less than about 100° C., and most preferably less than about 50° C., hence eliminating or reducing the potential of plugging by liquid boric oxide or, in the case of the lower preferred temperatures, also boric acid or its meta borate, within the transport member.

Concurrently, a gas is introduced into the gas purge region 34 exterior of the reactor chamber 16. This purge gas can preferably be independently selected from the same gases as the sweep gas. For example, in some cases it may be desirable to use nitrogen as the purge gas, whether or not it is also used as the sweep or entrainment gas, because of nitrogen's electrical properties. However, in cases where nitrogen-containing product is unacceptable it would be advisable to ensure that the nitrogen does not have access to the reactor chamber. One way to accomplish this is to maintain the gas in this region at an equilibrium or even negative pressure. This would be particularly advisable because of the porosity of the preferred graphite reactor wall, as well as potential leakage around construction joints. In other cases, it may alternatively be desirable to employ a positive purge gas pressure, to help to prevent escape of entrainment or sweep gas and reactant/product particles from the reactor chamber.

There is a significant temperature demarcation between the end of the reactants' pathway through the reactant transport member and the entrance into the reaction zone. This temperature demarcation is preferably extremely sharp in relation to the rate of travel of the reactants. The reaction zone temperature is much hotter, preferably above about 1400° C., more preferably above about 1600° C., and most preferably from about 1800° C. to about 2500° C. As the particles of boric oxide and carbon enter the hotter reaction zone, they are rapidly heated and reacted, with boric oxide reacting in either or both the liquid and vapor states. As discussed above, The portion of the boric oxide that remains at liquid temperature at or close to the demarcation between the two temperature zones, and would in many other furnace designs tend to deposit and plug the reactant transport member or other means of introduction, is discouraged from doing so because of the sweep gas. The sweep gas through the gas-flow space resuspends the liquid particles as they form and carries them on through into the reaction zone, where they are vaporized and thereby increase yield.

At the increased temperature of the reaction zone the reactants, e.g., boric oxide and carbon, form boron carbide. Because of the time increment required to ensure complete reaction the reaction zone is preferably elongated, and the reactant particle size and constituent intimacy, entraining gas's flow rate, length of the reaction zone, and reaction zone temperature are preferably suitable for ensuring completion of the desired reaction. It should be noted here that, where the desired product is a metastable product, the reactant composition, entraining gas flow rate and reaction zone temperature should be suitably adjusted, so that the reaction conditions are conducive to producing that product. Such adjustment conditions will be obvious to the skilled artisan, and will generally entail increasing the residence time of the reactants in the reaction zone.

Having formed the desired product, the entraining gas and volatile product particles are then introduced directly into the cooling chamber, which is preferably expanded. This expanded cooling chamber is preferably maintained at a temperature below about 350° C., i.e., below the softening point of any unreacted boric oxide. This is more preferably below about 100° C., and most preferably below about 50° C. Upon reaching this area the reaction is effectively stopped, with any unreacted boric oxide returning to the liquid and then recrystallized state rather than continuing to react with the product. The cooling chamber's preferred expanded configuration, as described above, in which the cooling chamber diameter is larger than the diameter of the cooling inlet and, in some cases, also larger than the diameter of the reactor chamber, serves two main purposes (1) it allows for adiabatic cooling, as well as radiative cooling due to a water jacket or similar cooling means, and thus substantially increases the cooling rate: and (2) it helps to eliminate adherence of significant quantities of unreacted liquid reactants, e.g., boric oxide, to the walls of the cooling chamber, by permitting recrystallization in space prior to wall contact. Again, plugging problems are reduced or eliminated because excess, unreacted boric oxide is discouraged from depositing on the walls of the cooling chamber or at the cooling inlet. This helps to ensure continuous operation, the preferred mode of operation, at this point in the reactor.

Finally, the product can preferably be collected after it has passed through the cooling zone. For this purpose a cyclone or other collection means, e.g., a filter arrangement of some type, can be used.

The resulting boron-containing powder shows substantial uniformity of constituent crystal shape and diameter. The powder is comprised of equiaxed crystals, preferably in the range of less than about 20 microns, more preferably less than about 5 microns, and most preferably from about 0.05 to about 0.30 micron in size. These features can enable fine-grained densification to theoretical or near-theoretical density and can reduce the presence of void spaces that can in turn have a detrimental effect on various physical properties such as strength of the densified piece. Densification methods which can be used to densify the ceramic powders of one embodiment of the present invention to form the densified parts of another embodiment of the present invention are known to those skilled in the art. The final product powder will in many cases contain unreacted, recrystallized boric oxide, which can be washed out of the product with hot water. The procedure for doing this is known to the skilled artisan. Examples of boron-containing powders producible in the apparatus and by the method of various embodiments of the present invention include, but are not limited to, boron carbide, boron-rich boron carbide, titanium diboride, boron nitride, silicon hexaboride, boron carbide/titanium diboride composites, boron-rich boron carbide/titanium diboride composites, silicon carbide/boron carbide composites, silicon carbide/silicon hexaboride composites, silicon carbide/boron-rich boron carbide composites, silicon carbide/boron nitride composites, and mixtures thereof.

An advantage of the present invention is the capability of concurrently synthesizing a physically mixed product. For example, a physically mixed $B_4C/TiB_2$ composite powder can be prepared from reactants such as boric oxide, carbon, and a titanium source such as titanium dioxide. A high degree of mixing is achieved while at the same time particle size is controlled similarly to processes synthesizing individual compounds.

In addition to manipulation of reactants to achieve the desired product as to size, configuration, and/or composition, it is also possible to adjust other variables. These variables include: (1) the temperature of the reactant transport member, reaction zone, and cooling zone: (2) the flow rate of the sweep and entrainment gases and therefore of the reactants; (3) the reaction zone cross-sectional dimension or dimensions and length; (4) the relationship of the diameters of the cooling chamber and the cooling inlet; and (5) the temperature of sweep, entrainment and byproduct gases within the reaction chamber. The quantity of byproduct gases generated in the reaction should in some cases be taken into account in making these adjustments, since it can affect flow rates. For most reactions the residence time is preferably from about 0.5 to about 10 seconds, but longer or shorter times can also be employed. In addition to gas flow rates, the residence time can be adjusted by altering the orientation of the reactor apparatus. The heating of the reactant particles as they pass into the reaction zone is preferably accomplished at a rate equal to or exceeding 1000° C./second.

The following examples are given to more fully illustrate the present invention, but are not intended to limit the scope of the invention. Unless otherwise indicated, all parts and percentages are by weight. All mesh sizes are American Standard Mesh, and are also shown in microns.

EXAMPLE 1

$B_4C/TiB_2$ Composite Powder

Feed preparation

A 0.95 lb quantity of $TiO_2$ and 38.2 lb quantity of boric acid ($H_3BO_3$) are added to 90 lb water under constant stirring in a 50-gallon jacketed stainless steel vessel. Steam flow is started to the vessel jacket and the temperature set point is adjusted to 90° C. In a separate container, 35.8 lb of corn starch is dispersed in 86 lb of water. The starch/water mixture is added to the boric acid solution. When the mixture temperature reaches 80° C., the resultant slurry is pumped to a chrome-plated double drum dryer operating at 135° C. A dried flake, containing 20 weight percent water, is produced at the rate of 1.2 lb/ft²-hr from the double drum dryer.

The dried flake is collected from the drum dryer hopper, placed in graphite boats, and calcined in a horizontal push furnace in a nitrogen atmosphere at 700° C. to form a mixture of carbon, boric oxide, and titanium dioxide. Boats are pushed through a 6 ft hot zone at the rate of 2 inches per minute. A resulting 24 lb quantity of calcined material is milled to −270 mesh (−53 microns). Nitrogen is used to prevent moisture pick-up by the hygroscopic boric oxide. A jet mill is equipped with boron carbide blasting nozzles to ensure that no impurities enter the feed material during the size reduction step. Chemical analysis of the milled carbon/boric oxide/titanium dioxide precursor reveals a composition of 34.4 weight percent carbon and 58.81 weight percent boric oxide (i.e., 18.64 weight percent boron). A thermogravimetric analysis indicates the milled feed is 1.2 weight percent surface water. Hence, the remaining 5.6 weight percent of feed is titanium dioxide and chemically bound water as boric acid.

Synthesis of boron carbide/titanium diboride composite powder

A vertical, radiatively heated reactor apparatus of one embodiment of the present invention, having a graphite reaction chamber measuring 5.5 inch internal diameter (I.D.)×5.5 foot long, is used. The reaction chamber is heated to 1900° C. A flowing argon atmosphere is used during the reaction. A 4.8 lb quantity of −270 mesh (−53 microns) loaded into an argon purged feed hopper. The feed is introduced into the reaction zone of the vertical furnace apparatus through a water-cooled copper reactant transport member. A screw feeder maintains the feed rate at approximately 0.25 lb/min until all of the feed is processed. Argon gas, flowing at the rate of 3.6 SCFM, assists gravity in sweeping the solids down through the vertical furnace.

Reaction product is collected downstream of the reactor tube in a pan. A downstream 18 inch internal diameter, 6 foot long expanded cooling zone is maintained, via a water cooling jacket, at about 55° C. As the reaction products reach this zone they are immediately cooled by radiation to a temperature below the reaction temperature. A 476 g quantity of fine product is washed in 80° C. deionized water for 2 hrs at a concentration of 400 g product per 0.5 liter water. This product is filtered and dried overnight in a forced gas convection oven.

Subsequent inspection of the reactor assembly indicates that no agglomerated, unreacted boric oxide is present along the inside surface of the reactor apparatus, including both the upper and lower sections of the reaction chamber itself. No significant amounts of unreacted boric oxide or product are found adhering to the inside wall of the expanded cooling zone located immediately below the reaction chamber.

Analysis of product composite powder

An X-ray diffraction pattern of the washed product indicates the presence of boron carbide (as $B_4C$ phase), titanium diboride, a small quantity of free carbon, and some residual insoluble oxides of boron. No unreacted titanium dioxide or synthesized titanium carbide is present in the X-ray pattern. Chemical analysis of the washed and dried pan product is 74.38 weight percent total boron, 0.31 weight percent free boron, 21.53 weight percent carbon, 2.90 weight percent oxygen, and 0.50 weight percent nitrogen. A metal analysis indicates the product contains 1.52 weight percent titanium, 83 ppm iron, 7 ppm copper, and 2 ppm nickel. From this analysis the composite powder product is determined to be 2.2 weight percent titanium diboride, 93.3 weight percent boron carbide ($B_4C$), and 1.3 weight percent free carbon. The remaining products are unreacted oxides of boron, boron nitride, and water. Surface area of the washed pan product is determined by (BET) as 32.8 m²/g, indicating extremely fine particle size. A transmission electron micrograph (FIG. 3 at 144,000×) of the washed and dried pan product indicates that the product is equiaxed crystals having a narrow particle size distribution of 0.05 to 0.2 microns. Titanium diboride crystals are uniformly dispersed within the boron carbide, as shown in the Ti K-alpha X-ray map as determined by EDS (Energy Dispersive X-ray Spectroscopy) (FIG. 4 at 800×), in which Ti appears white on the black $B_4C$ background.

Hot pressing of composite powder

A 7 g quantity of washed and dried product is placed in a graphite die and hot pressed at 2100° C. and 35 MPa (5000 psig) in an argon environment into a small densified part. The part is polished and analyzed by X-ray diffraction. The X-ray diffraction pattern indicates that the part is boron carbide, titanium diboride, and some free carbon. No titanium dioxide or oxides of boron are present. The part is chemically etched and an optical micrograph of the etched, dense part, showing the microstructure, indicates that grains within the pressed part are typically submicron in size (FIG. 5). The part is evaluated for hardness and fracture toughness by indentation-fracture. A 1.0 kg Vicker's Hardness of 3355+/−69 kg/mm² and $K_{Ic}$ fracture toughness value of 3.59+/−0.38 MPam$^{0.5}$ are recorded for the 2.2 weight percent $TiB_2$ composition. This reflects an increase in hardness over pure $B_4C$ synthesized and hot-pressed under similar conditions (see Example 3 below).

The increase in fracture toughness is believed to be due to crack deflection by the fine, tougher $TiB_2$ grains.

EXAMPLE 2

Boron Carbide

Feedstock preparation: About 35 lb of boric acid is added to about 90 lb of water under constant stirring in a 50 gallon jacketed stainless steel vessel. Steam flow is started to the vessel jacket and the temperature set point is adjusted to 90° C. In a separate container, 26.5 lb of cornstarch is dispersed in 90 lb of water. The starch/water mixture is added to the boric acid solution. When the mixture temperature reaches 80° C., the resultant slurry is pumped to a chrome-plated double drum dryer operating at 135° C. A dried flake, containing about 20 weight percent water, is produced at a rate of 1.2 $lb/ft^2$-hr from the double drum dryer.

The dried flake is collected from the drum dryer hopper, placed in graphite boats, and calcined to boric oxide and carbon in a horizontal push furnace in a nitrogen atmosphere at 700° C. The boats are pushed through a 6-foot hot zone at a rate of 2 inches per minute. A resulting 25 lb quantity of calcined material is crushed and jet milled with nitrogen to −325 mesh (−44 microns). Chemical analysis of the milled boric oxide and carbon mixture reveals a composition of 64.8 weight percent boric oxide (20.2 weight percent boron) and 33.1 weight percent carbon. A thermogravimetric analysis indicates the milled feed material to be 2 weight percent water.

Synthesis of boron carbide powder

The feed is loaded into a feed hopper and purged with argon for about 15 minutes. An argon pad is maintained on the feed hopper. At the same time the reactor apparatus of Example 1 is heated such that its reaction zone reaches about 1950° C. The feed is passed through the water-cooled copper reactant transport member into the reaction zone at a rate of about 0.26 lb/min. The feed rate is controlled by a solids screw feeder located above the reactor assembly. An argon entrainment gas flowing at 5.5 SCFM sweeps the pulverized precursor through the reactant transport member. Additional argon as sweep gas, flowing at 2.5 SCFM, enters the reaction zone through the gas-flow space between the water-cooled reactant transport member and the upper portion of the reaction zone. This flowing argon prevents deposition of boric oxide-containing feed particles at warm locations between the reactant transport member and the radiating upper reaction chamber. The reaction time of the feed in the hot reaction zone is governed by the flow rate of the argon and generated carbon monoxide and is about 0.7 second.

A downstream 18-inch internal diameter, 6 foot long expanded cooling zone is maintained, via a water cooling jacket, at about 55° C. As the reaction products reach this zone they are immediately cooled by radiation to a temperature below the reaction temperature. The feeding of the feedstock precursor into the reactor is continued for 20 minutes and then the screw feeder is stopped. This results in about 369 g of product being collected from downstream collection locations.

Subsequent inspection of the reactor assembly indicates that no agglomerated, unreacted boric oxide is present along the inside surface of the reactor apparatus, including both the upper and lower sections of the reactor chamber itself. No significant amount of unreacted boric oxide or product boron carbide is found adhering to the inside wall of the expanded cooling zone located immediately below the reactor chamber.

Analysis of product boron carbide powder

The product boron carbide crystals are determined to be virtually entirely submicron in size, about 0.1 micron average, as determined by a transmission electron micrograph. The product is washed in boiling water, dried, and chemically analyzed to be 76.8 weight percent boron, 20.5 weight percent carbon, 2.34 weight percent oxygen, and 0.38 weight percent nitrogen. A metal analysis indicates a high purity powder which contains 353 ppm Fe, 2 ppm Ni, 13 ppm Cr, 13 ppm Cu, and 25 ppm Ti. An X-ray diffraction pattern of the dried product shows primarily $B_4C$ boron carbide, with the remainder as primarily boron oxides. No free carbon is detected in the X-ray pattern.

Hot pressing of boron carbide powder

A small dense part is fabricated according to the method of Example 1 and evaluated. Analysis of the microstructure indicates that grains within the part are typically submicron in size. The part is evaluated for hardness by indentation-fracture. A 1.0 kg Vicker's hardness of $3217+/-129$ $kg/mm^2$ is recorded, indicating that the part has an extreme hardness characteristic of a fine-grained, pure boron carbide part.

EXAMPLE 3

Boron Carbide

Feed preparation

A −270 mesh (−53 microns) intimate carbon/boric oxide precursor of approximate composition 33.3 weight percent carbon, 61.7 weight percent boric oxide (19.2 weight percent boron), and 5 weight percent water is prepared according to the method of Example 2.

Synthesis of boron carbide powder

The precursor is processed in the same apparatus as that of previous examples. The reaction zone is brought to and maintained at a temperature of 1900° C. as determined by an optical pyrometer. The feed is introduced continuously for approximately 30 minutes through the water-cooled copper reactant transport member at a rate of about 0.30 lb/min. An argon entrainment gas flow rate of 1.70 SCFM entrains the fine feed powder through the reactant transport member. Additional argon, flowing at 1.90 SCFM enters the reaction zone through the gas-flow space between the water-cooled reactant transport member and the upper portion of the reactant zone. The reaction time of the feed in the reaction zone is approximately 1.3 seconds. Upon exiting the reaction zone, the product powder passes through the cooling chamber as described in previous examples and is collected downstream.

Inspection of the reactor assembly following completion of the run indicates that no agglomerated, unreacted boric oxide is present along the inside surface of the reactor apparatus, including both the upper and lower sections of the reactor chamber itself. No significant amounts of unreacted boric oxide or product boron carbide are found adhering to the inside wall of the expanded cooling chamber located immediately below the reactor chamber.

Analysis of product boron carbide powder

Washed product powder is evaluated for crystal size and chemical composition. A transmission electron micrograph (TEM) indicates that the powder is equiaxed submicron sized crystals having a narrow particle size distribution of about 0.05 to about 0.2 micron. The product powder is chemically analyzed to be 74.6 weight percent boron, 20.2 weight percent carbon, 1.95 weight percent oxygen and 0.27 weight percent nitrogen. A metal analysis indicates a high purity product containing only 150 ppm Fe, 6 ppm Ni, and 4 ppm Cr.

Hot pressing of boron carbide powder

A small dense part is fabricated according to the method of Example 1 and evaluated. An X-ray diffraction pattern of the part indicates the presence of a pure $B_4C$ phase boron carbide with no free carbon. Analysis of the microstructure indicates that grains within the part are typically submicron in size. The part is evaluated for hardness by indentation-fracture. A 1.0 kg Vicker's hardness of $3210+/-116$ kg/mm$^2$ is recorded, indicating that the part has an extreme hardness characteristic of a fine-grained, pure $B_4C$ part.

EXAMPLE 4

Boron Carbide

Feed preparation

A $-270$ mesh ($-53$ microns) intimate carbon/boric oxide feed, having the approximate composition of 35.8 weight percent carbon, 61.3 weight percent boric oxide (19.1 weight percent boron), and 2.9 weight percent water, is prepared according to the method of Example 2.

Synthesis of boron carbide powder

The feed is processed in the same apparatus as that of previous examples. The reaction zone is brought to and maintained at a temperature of 2000° C. as determined by an optical pyrometer. The feed is introduced continuously for about 30 minutes through the water-cooled copper reactant transport member at a rate of about 0.24 lb/min. An argon entrainment gas flow rate of 5.0 SCFM entrains the fine feed powder through the reactant transport member. Additional argon, flowing at 2.2 SCFM enters the reaction zone through the gas-flow space between the water-cooled reactant transport member and the upper portion of the reactant zone. The reaction time of the feed powder in the reaction zone is about 0.7 second. Upon exiting the reaction zone, product powder passes through the cooling chamber as described in previous examples and is collected downstream.

Inspection of the reactor assembly following completion of the run indicates that no agglomerated, unreacted boric oxide is present along the inside surface of the reactor apparatus, including both the upper and lower sections of the reaction chamber itself. No significant amounts of unreacted boric oxide or product boron carbide is found adhering to the inside wall of the expanded cooling zone located immediately below the reaction chamber.

Analysis of product boron carbide powder

Washed product powder is evaluated for crystal size and chemical composition. A transmission electron micrograph indicates that the powder is equiaxed submicron-sized crystals having a narrow particle size distribution of from about 0.05 to about 0.2 micron. The product powder is chemically analyzed to be 77.3 weight percent boron, 21.4 weight percent carbon, 0.99 weight percent oxygen and 0.26 weight percent nitrogen. A metal analysis indicates a high purity product containing only 230 ppm Fe, 23 ppm Ni, and 20 ppm Cr.

Hot-pressing of boron carbide powder

A small dense part is fabricated according to the method of Example 1 and evaluated. Analysis of the microstructure indicates that grains within the part are typically submicron in size. The part is evaluated for hardness by indentation-fracture. The part is evaluated for hardness of $3213+/-170$ kg/mm$^2$ is recorded, indicating that the part has an extreme hardness characteristic of a fine grained, pure $B_4C$ part.

EXAMPLE 5

Boron Carbide

Feed preparation

A $-270$ mesh ($-53$ microns) intimate carbon/boric oxide feed, of approximate composition 36.1 weight percent carbon, 60.8 weight percent boric oxide (18.9 weight percent boron), and 3.1 weight percent water, is prepared according to the method of Example 2.

Synthesis of boron carbide powder

The feed is processed in the same apparatus as that of previous examples. The reaction zone is brought to and maintained at a temperature of 1850° C. as determined by an optical pyrometer. The feed is introduced continuously for about 30 minutes through the water-cooled copper reactant transport member at a rate of about 0.25 lb/min. An argon entrainment gas flow rate of 5.0 SCFM entrains the fine feed powder through the reactant transport member. Additional argon, flowing at 2.2 SCFM enters the reaction zone through the gas-flow space between the water-cooled reactant transport member and the upper portion of the reaction zone. The reaction time of the feed powder in the reaction zone is about 0.8 seconds. Upon exiting the reaction zone, product powder passes through the cooling chamber as described in previous examples and is collected downstream.

A small quantity of the collected product powder is washed and chemically analyzed to be approximately 32.4 weight percent carbon and 2.60 weight percent oxygen, indicating only about 90 percent conversion of the reactant carbon. The remaining unwashed product is reloaded into the feed hopper and purged with argon. The reaction zone is brought to and maintained at a temperature of 1850° C. The first pass product is then fed continuously back through the water-cooled copper reactant transport member at a rate of about 0.25 lb/min. The total flow of argon entering the reactor chamber is about 3.6 SCFM. The reaction time of the powder during the second pass through the reaction zone is approximately 1.4 seconds, making the total residence time for the run approximately 2.2 seconds.

Analysis of product boron carbide powder

Washed product powder is evaluated for crystal size and chemical composition. A transmission electron micrograph indicates that the powder is equiaxed submicron-sized crystals having a narrow particle size distribution of about 0.02 to about 0.1 microns. The product powder is chemically analyzed to be 75.1 weight percent boron, 21.2 weight percent carbon, 2.17 weight percent oxygen and 0.43 weight percent nitrogen. A metal analysis indicates a high purity product containing only 351 ppm Fe, 11 ppm Ni, and 10 ppm Cr, 10 ppm Cu, and 15 ppm Ti.

Hot-pressing of boron carbide powder

A small dense part is fabricated according to the method of Example 1 and evaluated. Analysis of the microstructure indicates that grains within the part are typically submicron in size. The part is evaluated for hardness by indentation-fracture. A 1.0 kg Vicker's hardness of $3239+/-112$ kg/mm$^2$ is recorded, indicating that the part has an extreme hardness characteristic of a fine grained, pure $B_4C$ part.

EXAMPLE 6

Boron Carbide

Feed preparation

A $-270$ mesh ($-53$ microns) intimate carbon/boric oxide feed, of approximate composition 33.1 weight percent carbon, 59.8 weight percent boric oxide (18.6 weight percent boron), and 7.1 weight percent water, is prepared according to the method of Example 2.

Synthesis of boron carbide powder

The feed is processed in the same apparatus as that of previous examples. The reaction zone is brought to and maintained at a temperature of 2100° C. as determined by an optical pyrometer. The feed is introduced continuously for about 30 minutes through the water-cooled copper reactant transport member at a rate of about 0.20 lb/min. An argon entrainment gas flow rate of 4.0 SCFM entrains the fine feed powder through the reactant transport member. Additional argon, flowing at 2.9 SCFM enters the reaction zone through the gas-flow space between the water-cooled reactant transport member and the upper portion of the reaction zone. The reaction time of the feed powder in the reaction zone is about 0.8 second. Upon exiting the reaction zone, product powder passes through the cooling chamber as described in previous examples and is collected downstream.

Analysis of product boron carbide powder

Washed product powder is evaluated for crystal size and chemical composition. A transmission electron micrograph (TEM) indicates that the powder is equiaxed submicron sized crystals having a narrow particle size distribution of about 0.1 to about 0.3 micron. The washed product powder is chemically analyzed to be approximately 78.6 weight percent boron, 20.5 weight percent carbon, 0.80 weight percent oxygen and 0.14 weight percent nitrogen. An X-ray diffraction pattern indicates the powder to be boron carbide.

Example 7

Boron-Rich Boron Carbide

Feed preparation

About 43.6 lb of $H_3BO_3$ is added to about 90 lb of water under constant stirring in a 50-gallon jacketed stainless steel vessel. Steam flow is started to the vessel jacket and the temperature set point is adjusted to 90° C. In a separate container, 21.5 lb of cornstarch is dispersed in 90 lb of water. The starch/water mixture is added to the boric acid solution. When the mixture temperature reaches 80° C., the resultant slurry is pumped to a chrome-plated double drum dryer operating at 135° C. A dried flake, containing about 20 weight percent water, is produced at a rate of 1.2 lb/ft$^2$-hr from the double drum dryer.

The dried flake is collected from the drum dryer hopper, placed in graphite boats, and calcined to boric oxide and carbon in a horizontal push furnace in a nitrogen atmosphere at 700° C. The boats are pushed through a 6-foot hot zone at a rate of 2 inches per minute. A resulting 28.9 lb quantity of calcined material is crushed and milled to $-325$ mesh ($-44$ microns). Chemical analysis of the milled boric oxide and carbon mixture reveals a composition of 69.1 weight percent boric oxide (21.5 weight percent boron) and 23.9 weight percent carbon. A thermogravimetric analysis indicates the milled feed material to be 7 weight percent water.

Synthesis of boron-rich boron carbide powder

The feed is processed in the same apparatus as that of previous examples. About 22.01 lb of $-325$ mesh ($-44$ microns) feed prepared as described in this example is introduced through the reactant transport member and into the reaction zone of the vertical furnace. A screw feeder maintains a feed rate of about 0.2 lb/min until all of the feed is processed. Argon gas, flowing at a total rate of about 10 SCFM, carries the reactants and product through the furnace. Some of the argon entrains feed particles through the water-cooled reactant transport member, and the rest enters the reaction zone through the gas-flow space between the reactant transport member and the upper radiating surface of the reactor chamber.

About 3.32 lb of reaction product is collected downstream of the vertical reactor apparatus cooling chamber. The product is washed in mild HCl solution (pH about 3) at 80° C. An X-ray diffraction pattern of the product indicates that there is no detectable free carbon present and that the product carbide phase is boron carbide. Chemical analysis of the washed product is 9.0 weight percent carbon, 88.04 weight percent fixed boron, and 0.80 weight percent oxygen, indicating formation of a boron-rich boron carbide. A scanning electron micrograph of the washed pan product indicates that the product is equiaxed fine crystals having a narrow size distribution. Inspection of the reactor assembly, including the reactant transport member and cooling chamber, reveals no significant deposition of agglomerated unreacted feed boric oxide or product boron carbides.

Hot pressing of boron-rich boron carbide powder

A small quantity of washed and dried powder is placed in a graphite die and hot-pressed under conditions of 2100° C. and 35 MPa (5000 psig) in an argon environment. The powder is found to melt in the graphite die, reacting with it and making it impossible to separate the fused part/die. The fused part is crushed and chemically analyzed as having the composition of $B_4C$, indicating that excess boron has reacted with the die to form the more thermodynamically favorable form of boron carbide, i.e., $B_4C$.

In a second attempt to fabricate a boron-rich boron carbide part, a small quantity of the powder is placed in a boron nitride die and hot-pressed under identical conditions of 2100° C. and 35 MPa in an argon environment. The part shows building of a liquid phase, and a large grain size results.

In a third attempt to fabricate a boron-rich part, a small quantity of the powder is placed in a boron nitride die and hot-pressed at 2000° C. and 35 MPa in an argon environment. Following hot-pressing, this part is removed and its microstructure analyzed. Microstructural evaluation of the part reveals two different grain structures that react differently when chemically etched. The part is crushed and chemically analyzed. An X-ray diffraction pattern indicates the part to be boron carbide with small amounts of a second phase present. Chemical analysis of the crushed part indicates a composition of 9.05 weight percent carbon, 89.23 weight percent fixed boron, 1.26 weight percent oxygen, and 0.46 weight percent nitrogen. Thus, the boron-rich boron carbide part has a molar B/C ratio of approximately 11.2. The chemical analysis leads to the belief that the resulting part is two or more phases containing $B_4C$ or $B_{13}C_2$ and a highly boron-rich phase such as $B_8C$ or $B_{25}C$.

EXAMPLE 8

Boron-Rich Boron Carbide

A −325 mesh (−44 microns) boric oxide/carbon feed, of composition 67.5 weight percent $B_2O_3$ (21.0 weight percent boron), 25.2 weight percent carbon, and 7.2 weight percent water, is prepared in a manner similar to that described in Example 7. The reactor chamber of the apparatus described in Example 1 is heated to 2100° C. A flowing argon atmosphere is used during the reaction. An 8.1 lb quantity of the feed is loaded into an argon purged feed hopper, and introduced into the reactor apparatus as described in previous examples. A screw feeder maintains the feed rate at about 0.3 lb/min until all of the feed is processed. Argon gas, flowing at the total rate of about 10 SCFM, sweeps the solids through the reactor apparatus. Some argon entrains feed particles through the cooled reactant transport member, while some sweeps through the gas space between the reactant transport member and the upper surface of the radiating reactor chamber. Reaction products are immediately cooled by radiation within the downstream cooling chamber.

A 2.54 lb quantity of reaction product is collected downstream of the reaction and cooling zones. The product is washed in mild HCl solution (pH about 3) at 80° C. Chemical analysis of the washed product reveals 74.2 weight percent fixed boron, 12.38 weight percent fixed carbon, and 5.4 weight percent free carbon. An X-ray diffraction pattern of the washed product indicates that the product carbide phase is $B_{13}C_2$. A transmission electron micrograph of the washed pan product indicates that the product is equiaxed crystals having a narrow size distribution in the 0.1 to 0.2 micron particle size range.

Inspection of the reactor chamber and the downstream cooling chamber indicates no significant deposition of agglomerated, unreacted feed boric oxide or product boron carbide.

What is claimed is:

1. A method of preparing uniform, fine boron-containing ceramic powder by carbothermal reduction comprising:
    (1) feeding boric oxide or a hydrate thereof and a carbon source as reactants into a reactor comprising
        (a) a cooled reactant transport member;
        (b) a reactor chamber;
        (c) a heating means; and
        (d) a cooling chamber;
    the cooled reactant transport member comprising a wall defining a conduit that communicates with the reactor chamber, with a gas-flow space being defined along the perimeter of the reactant transport member and in communication with the reactor chamber
    the reactor chamber comprising a wall defining a reaction zone:
    the heating means being associated with the reaction zone, and adapted for heating reactants in the reaction zone: and
    the cooling chamber comprising a wall defining a cooling zone that communicates with the reactor chamber:
    the temperatures of the reactant transport member, the reactor chamber, and the cooling chamber being independently controllable;
    such that reactants can be fed through the reactant transport member into the reaction zone, reacted to form products, and the products then fed into the cooling zone to produce uniform, fine ceramic powders;
    the boric oxide or hydrate thereof and the carbon source being fed through the cooled reactant transport member, the reactant transport member being maintained at a temperature below the melt temperature of the reactants;
    (2) reacting the reactants at a temperature above about 1400° C. in the reaction zone under reaction conditions sufficient to form a uniform, fine boron-containing ceramic powder; and
    (3) cooling the ceramic powder in the cooling zone.

2. The method of claim 1 wherein the reactor chamber communicates with the cooling chamber by means of a cooling inlet, and wherein the diameter of the cooling zone is larger than the diameter of the cooling inlet.

3. The method of claim 1 wherein boric oxide or a hydrate thereof and at least one other inorganic oxide are fed through the cooled reactant transport member.

4. The method of claim 3 wherein the other inorganic oxide is selected from the group consisting of titanium dioxide, silicon dioxide, aluminum oxide, zirconium dioxide and mixtures thereof.

5. The method of claim 1 wherein the carbon source is selected from the group consisting of carbon, carbon black, acetylene carbon black, a carbohydrate, a vinylidene chloride polymer, and mixtures thereof.

6. The method of claim 1 wherein gas is flowed through the gas-flow space into the reactor chamber.

7. The method of claim 6 wherein the gas is an inert gas, a reaction-compatible gas, or a reactant gas.

8. The method of claim 7 wherein the gas is selected from the group consisting of argon, carbon monoxide, nitrogen, helium, hydrogen and mixtures thereof.

9. The method of claim 1 further comprising a gas purge region surrounding the reactor chamber.

10. The method of claim 9 wherein the gas purge region contains an inert or reaction-compatible gas.

11. The method of claim 1 wherein the boric oxide or hydrate thereof and the carbon source are entrained in an inert or reaction-compatible gas.

12. The method of claim 11 wherein the gas is argon, carbon monoxide, nitrogen, helium, hydrogen or a mixture thereof.

13. The method of claim 1 wherein the reactant transport member is maintained at a temperature below about 350° C.

14. The method of claim 1 wherein the reactant transport member is maintained at a temperature below about 100° C.

15. The method of claim 1 wherein the reaction chamber is maintained at a temperature above about 1600° C.

16. The method of claim 1 wherein the cooling chamber is maintained at a temperature below about 350° C.

17. The method of claim 1 wherein the cooling chamber is maintained at a temperature below about 100° C.

18. The method of claim 1 being selected from the group consisting of boron carbide, boron-rich boron carbide, boron nitride, titanium diboride, silicon hexaboride, titanium diboride/boron carbide composites, titanium diboride/boron-rich boron carbide composites, silicon carbide/boron carbide composites, silicon carbide/boron-rich boron carbide composites, silicon carbide/boron nitride composites, silicon carbide/silicon hexaboride composites, and mixtures thereof.

19. The method of claim 5 wherein the carbon is carbon black.

20. The method of claim 19 wherein the carbon black is acetylene carbon black.

* * * * *